United States Patent
Puide et al.

(10) Patent No.: US 7,101,167 B2
(45) Date of Patent: Sep. 5, 2006

(54) METHOD AND A DEVICE FOR MANUFACTURING A TOOL AND A TOOL MADE BY THE METHOD

(75) Inventors: Mattias Puide, Fagersta (SE); Johnny Bruhn, Norberg (SE); Mikael Grönkvist, Norrköping (SE)

(73) Assignee: SECO Tools AB, Fagersta (SE)

( * ) Notice: Subject to any disclaimer, the term of this patent is extended or adjusted under 35 U.S.C. 154(b) by 253 days.

(21) Appl. No.: 10/128,410

(22) Filed: Apr. 24, 2002

(65) Prior Publication Data

US 2002/0110432 A1    Aug. 15, 2002

Related U.S. Application Data

(62) Division of application No. 09/586,974, filed on Jun. 5, 2000.

(30) Foreign Application Priority Data

Jun. 3, 1999    (SE) .................................. 9902059

(51) Int. Cl.
 B29C 47/12    (2006.01)
(52) U.S. Cl. .................. 425/381; 425/76; 425/465; 425/466
(58) Field of Classification Search .............. 425/78, 425/79, 380, 381, 465, 466; 408/144, 227, 408/230; 76/108.1, 108.6, 115
 See application file for complete search history.

(56) References Cited

U.S. PATENT DOCUMENTS 4,351,631 A * 9/1982 Gessner et al. ............. 425/533
4,671,763 A * 6/1987 Weiler ........................ 425/525
4,779,440 A    10/1988 Cleve et al.
5,438,858 A    8/1995 Friedrichs
5,792,490 A * 8/1998 Geiger ....................... 425/532
5,947,660 A    9/1999 Karlsson et al.
5,989,482 A * 11/1999 Sagawa ...................... 264/515
6,176,699 B1 * 1/2001 Franjo et al. ............... 425/528

FOREIGN PATENT DOCUMENTS

EP    0 458 774    11/1991
WO    WO98/28455    7/1998

* cited by examiner

Primary Examiner—Duane Smith
Assistant Examiner—Emmanuel S. Luk
(74) Attorney, Agent, or Firm—Drinker Biddle & Reath LLP

(57) ABSTRACT

A rotary tool such as a helix drill and an end mill for example, is manufactured by forming a blank by an extrusion process, and then sintering the blank. During the extrusion, a mixture is passed through a die which provides a cylindrical shape to the outer peripheral surface of the mixture. A plurality of jaws are disposed downstream of the die for conducting the mixture. Each jaw includes a helical ridge for engaging the outer surface of the extrudate to cause a helical groove to be formed therein which constitutes a chip flute in the tool. During the extrusion, the jaws are moved away from the mixture to terminate formation of the chip groove, whereby a shank portion of the tool is formed.

6 Claims, 4 Drawing Sheets

FIG. 2A
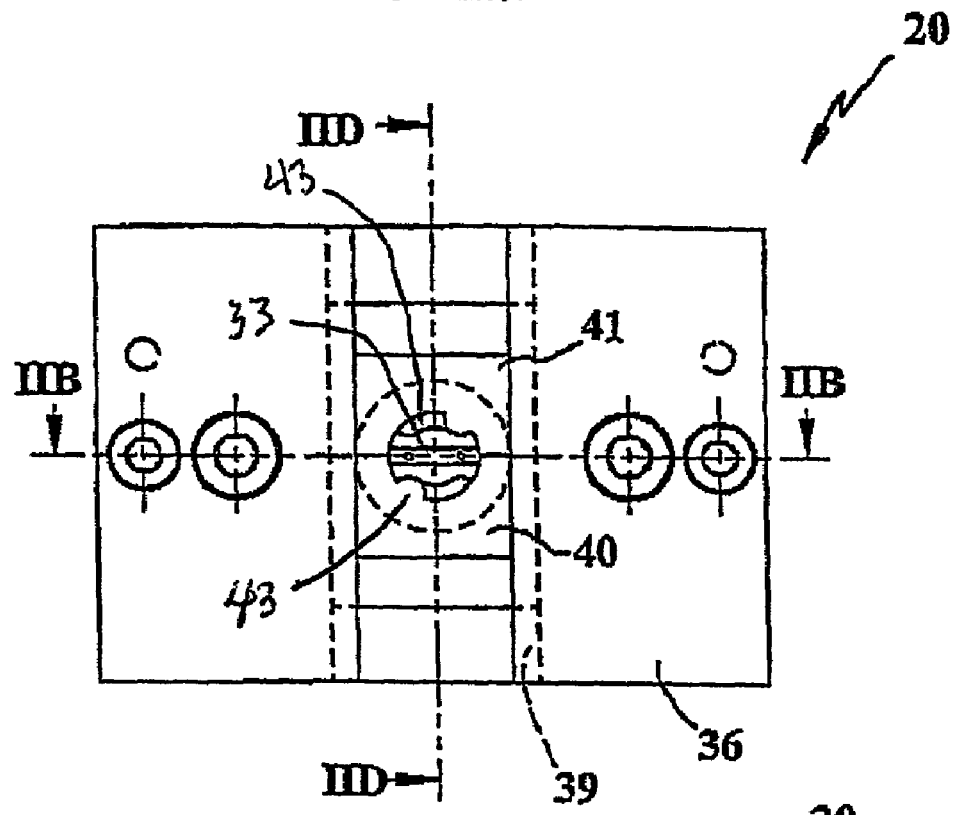
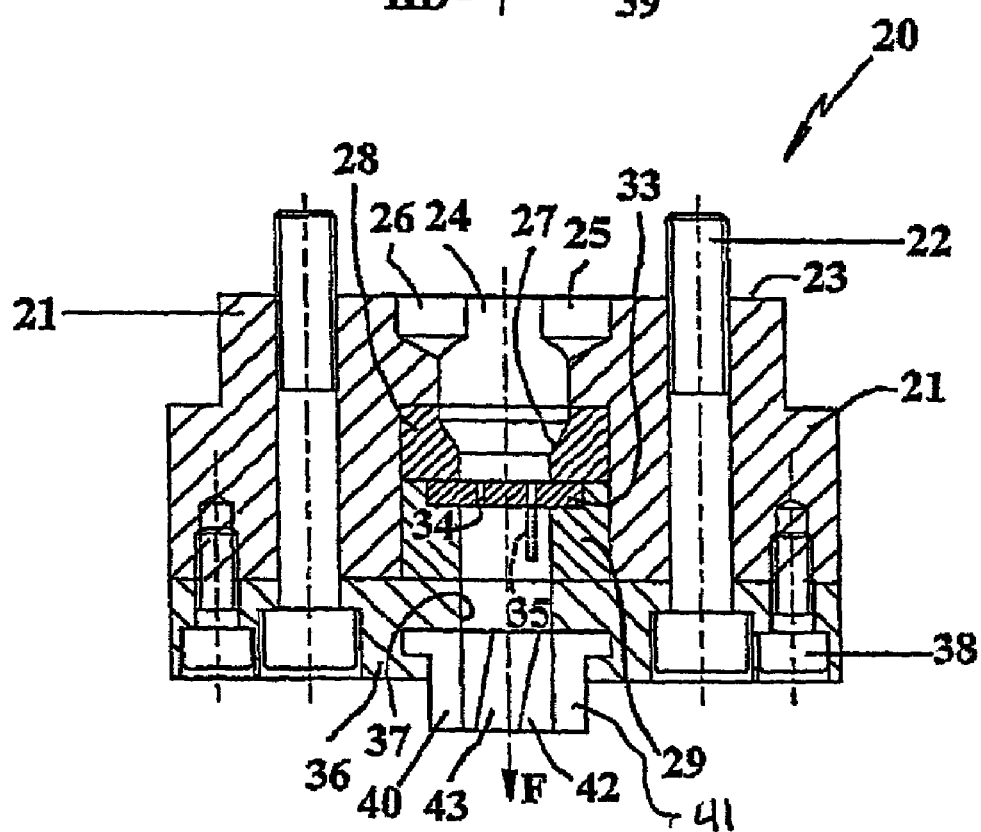
FIG. 2B

METHOD AND A DEVICE FOR MANUFACTURING A TOOL AND A TOOL MADE BY THE METHOD

This application is a divisional of application Ser. No. 09/586,974, filed on Jun. 5, 2000.

FIELD OF THE INVENTION

The present invention relates to a method and a device for manufacturing a tool and a tool made by the method.

PRIOR ART

It is previously known through for example International Publication WO 98/28455 to press material powder, such as wolfram carbide (WC) together with cobalt (Co), between a punch and a die, and subsequently to sinter the material such that the binder metal is melted and binds the carbides to form tool material for chip removing machining. The known technique brings about a plurality of drawbacks. The powder give off dust and the formed green body (pressed but not sintered material) will not endure handling to any degree. Furthermore the chip flutes must be ground and the method requires time and energy. The problems have partly been solved by the injection molding of hard metal mixed in a carrier such as indicated in U.S. Pat. No. 5,947,660. The method of injection moulding brings a high degree of freedom concerning geometry but brings costly investments in moulds.

Through U.S. Pat. No. 4,779,440 a tool is previously known for forming a blank for a helix drill. An extruded drill blank having chip flutes of constant pitch along the circumference of the blank is obtained by heating a hard metal powder to extrusion temperature, pressing the heated powder blank under high energy consumption through a space defined by a mandrel and a nozzle while rotating the blank. The blank is guided during the extrusion past a helical ridge provided at the inside of the nozzle, to shape helical chip flutes along the blank as the blank rotates. A drawback of the known technique is that the chip flutes are obtained along the entire length of the blank.

OBJECTS OF THE INVENTION

One object of the present invention is to provide a method, a device and a tool, whereby the drawbacks of the known technique are eliminated.

Another object of the present invention is to provide a method and a device whereby the lengths of the chip flutes can be determined.

SUMMARY OF THE INVENTION

These and other objects have been achieved by a method and apparatus for manufacturing a tool as well as a tool made by the method.

The method of manufacturing a rotary tool for chip removing machining comprises the steps of:

A. providing a mixture of a hard metal powder and a carrier;
B. heating the mixture;
C. extruding the heated mixture in a feed direction through a die which forms the mixture with a cylindrical outer surface;
D. conducting the mixture past a flute-forming structure which forms a chip flute along a first section of the outer surface;
E. displacing the flute-forming structure laterally away from the outer surface during step C for terminating the chip flute formation along a second section of the outer surface which defines a shank portion;
F. allowing the mixture to solidify and form a blank; and
G. sintering the blank.

The apparatus is adapted to be mounted to an extrusion machine for shaping a mixture received from the extrusion machine into a rotary tool for chip forming machining. The apparatus comprises a housing which is adapted to be mounted to an extrusion machine and forms a through-passage for conducting the mixture in a feed direction. The through-passage defines a center axis. A nozzle is provided which forms a restriction in the passage. A die is disposed downstream of the nozzle and includes a through-hole. At least one jaw is situated adjacent a downstream end of the die and is movable toward the axis to an inner position in engagement with the mixture received from the die for applying a shape thereto. The die is movable away from the axis to an outer position to avoid applying the shape thereto.

The invention also pertains to a rotary tool made by the above-described method.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2A is a front view of an apparatus according to the present invention;

FIG. 2B is a sectional view taken along the line IIB—IIB in FIG. 2A;

DETAILED DESCRIPTION OF A PREFERRED EMBODIMENT OF THE INVENTION

Figure 1B:
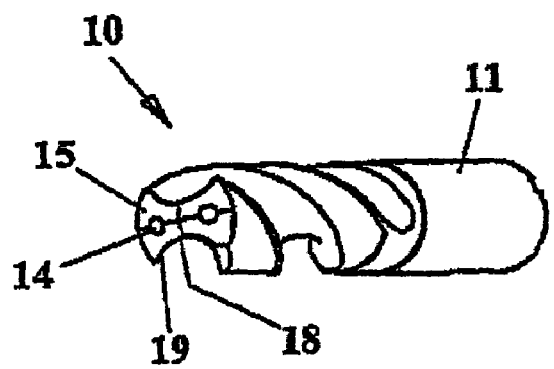
FIG. 1B is a front perspective view of the drill depicted in FIG. 1A.
Figure 1A:
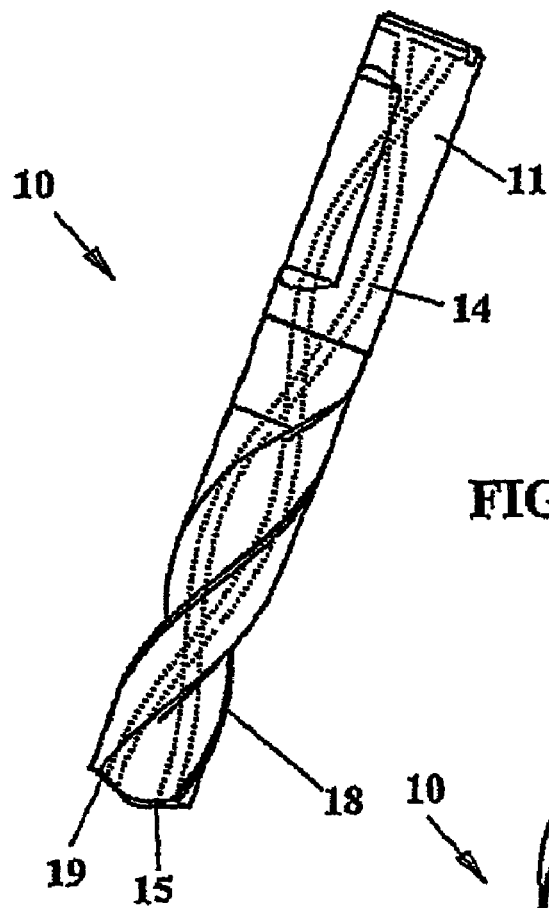
FIG. 1A is a side elevational view of drill made according to the present invention.
Figure 1C:
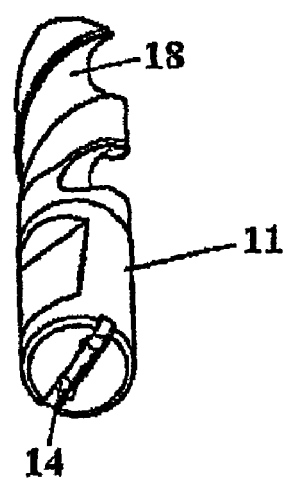
FIG. 1C is a rear perspective view of the drill depicted in FIG. 1A.
Figure 2C:
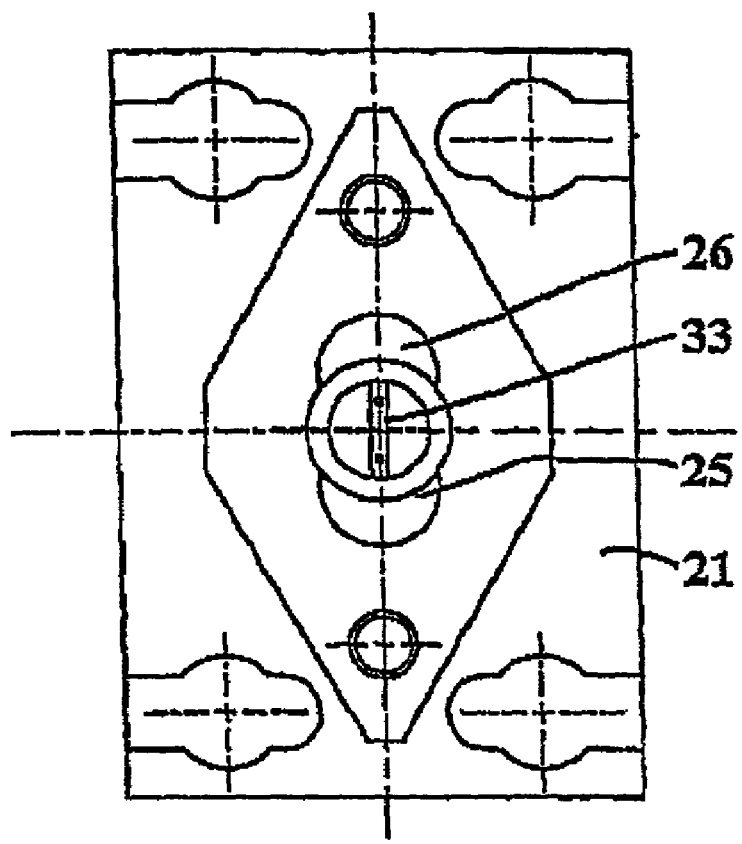
FIG. 2C is a rear end view of the apparatus depicted in FIG. 2A.
Figure 2D:
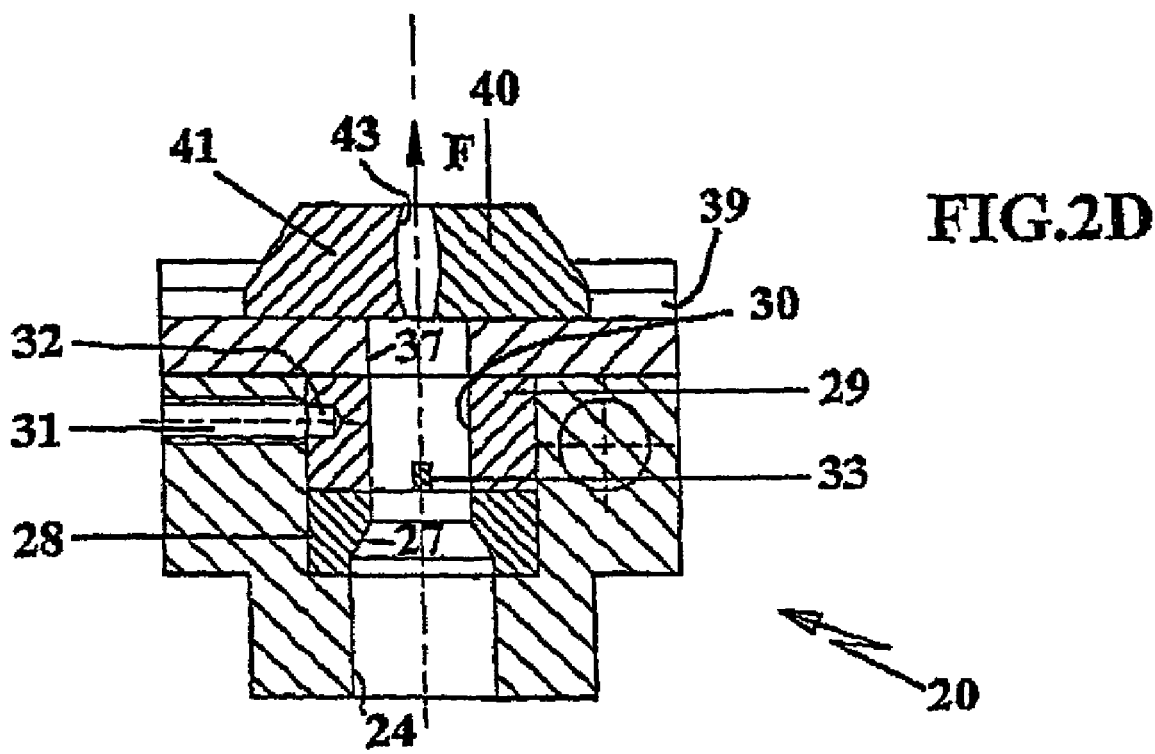
FIG. 2D is a sectional view taken along the line IID—IID in FIG. 2A.

The preferred embodiment of a tool according to the invention shown in FIGS. 1A–1C is a so-called helix drill. The drill 10 is solid and made of hard material, such as extruded hard metal (e.g. carbide), and includes helical chip flutes 18, and a non-fluted shank 11 adapted to be secured to a rotary spindle, not shown. The drill has two upper clearance surfaces 15. All surfaces and associated edges are made from the same material, i.e. preferably in extruded hard metal. Lines of intersection of the chip flutes 18 and the clearance surfaces 15 form main cutting edges 19, preferably having reinforcing chamfers, not shown. The entire length of the drill is from 3 to 10 times its diameter. Two flush channels 14 extend through the entire drill to transfer flushing medium from the spindle to the tip of the drill. A diametrical groove has been provided at the rear end face of the shank to counteract obstruction of the holes, for example.

Figure 3:
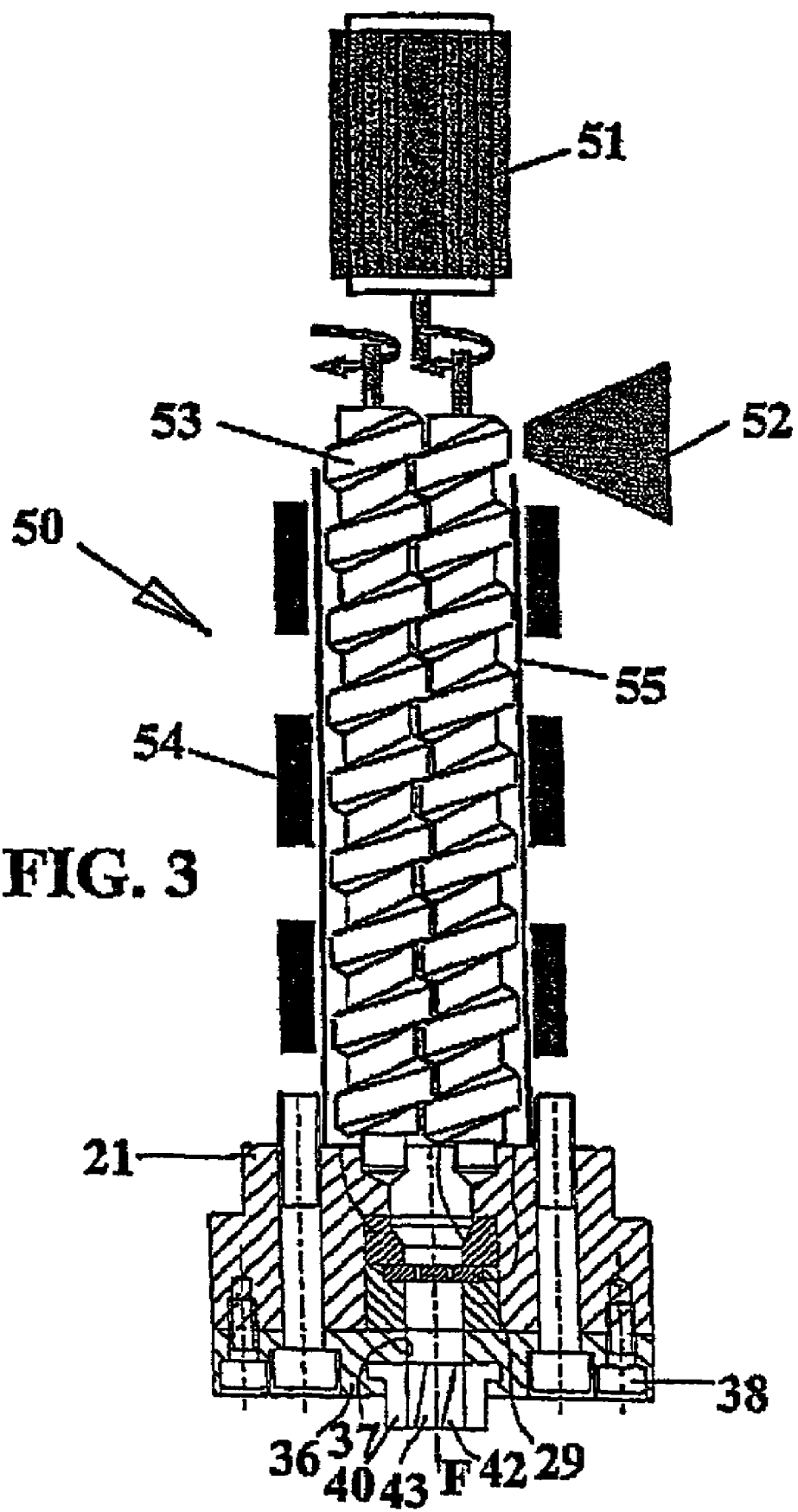
FIG. 3 is a view of the apparatus shown in FIG. 2B attached to an extrusion machine.

In FIGS. 2A–2D there is shown a device 20 according to the present invention for the production of elongated green bodies. The device 20 comprises a rectangular steel housing 21, which is intended to be fastened by, for instance, bolts to an extrusion machine 50 (see FIG. 3). The housing 21 has two bolts 22 to be fastened in the machine and has a rear surface 23 intended to seal against said machine. The housing has a central through-going recess 24 through which a compound will be pressed. The recess 24 is widened at the rear surface 23 to form spaces 25, 26 for receiving two feed worm 53 ends, FIG. 3. The recess 24 transforms into a diameter-reducing restriction 27 in a circular nozzle 28. The nozzle 28 is made from a wear resistant material such as hard metal. The recess 24 then continues via a cylindrical inner, centrally positioned hole 30 into a circular die 29, which is provided next to the nozzle 28. The position of the die 29 relative to the housing is determined by cooperation between a stop screw 31 in the housing and a hole 32 in the die extending laterally relative to the principal feed direction F of the compound. A bar-shaped core 33 is disposed in the die. The core is rectangular and includes two holes 34 to receive elongated pins 35. The pins 35 are intended to project from the core in the feed direction F in case flush channels are to be formed in the blank. The recess 24 then continues in the form of a coaxial hole 37 in a lid 36. The lid 36 is attached to the housing by means of two screws 38 and screws 22. The lid 36 is provided with a groove 39, which extends between two long sides of the lid 36. The groove 39 is intended to receive a jaw structure comprised of two jaws 40, 41, which together form a T-shape, see FIG. 2B. The jaw structure includes an open inlet and an open outlet through which the extrudate passes upon exiting the die, the open inlet and open outlet being of substantially the same size. Each jaw 40, 41 includes a recess 42 facing towards the other jaw. Each recess 42 includes a helical ridge 43 shaped to form a chip flute such that when the jaws are pressed against each other the recesses form the cross-section of a helix drill having chip flutes. The jaws are pressed against each other in a radial direction, i.e. laterally of a center axis of the device, by suitable power means, not shown, and the same power means is also used to displace the jaws radially away from one another in the groove 39, such as when a portion of the extruded blank must be non-fluted, for example the drill shank portion 11. Preferably a supporting table is placed in connection with the jaws to support the hot extruded blank.

The drill or the milling cutter is manufactured as follows. Hard metal powder having a certain cobalt content and a carrier, for example a polymer or a plastic, is mixed and shaped into pellets or granulates. The content of binder lies within the interval of 1–10 percent by weight. The expression "cobalt" shall here be understood as a metallic binder that alternatively can be exchanged for or include other metals, for example nickel, Ni. Subsequently the mixture or compound is preheated to a temperature suitable for the particular mixture and is inserted in an extrusion machine 50. The machine 50, see FIG. 3, includes a funnel 52 to receive pellets, two feed worms 53 rotatable by means of a motor in a casing 55, and heaters 54. Then the mixture is pressed into the recess by means of the two feed worms 53 at a certain pressure and a certain temperature, i.e., about 180° C., that is considerably lower than in the prior art where the melting temperature of cobalt is required. The restriction 27 will further compress the mixture or compound.

Then the hot compound reaches the core 33 and passes along opposite sides thereof through the two substantially semi-circular openings formed at respective ones of the sides. Rearwardly (downstream) of the core in the feed direction F the compound fuses into a cylindrical body. If the pins 35 are provided in the core, then spaces are formed in the body, which later will constitute flush channels. The pins are made long enough to allow the compound to cool such that fusion within the flush channels is avoided. Subsequently the compound reaches the jaws 40, 41 which are disposed in an inner position. The compound travels through the recesses 42 defined by the jaws 40, 41 whereby the compound, due to the geometries of the ridges 43, travels helically through the jaws and obtains the cross-section of a helix drill. The ridges 43 need not be identical. When the compound comes out from between the jaws it cools quickly due to the surrounding temperature, and the blank continues to extrude until the fluted part is sufficiently long. Subsequently the jaws 40, 41 are radially separated to outer positions away from the compound such that a cylindrical non-fluted shank portion is formed. The length of the shank part is determined either by how long the extrusion is continued or by when the jaws are displaced inwardly such that the formation of a new blank is initiated. In the latter case two or more blanks are continuous. The solidified blank can then be cut or simply be broken, for example by hand, into suitable lengths, e.g., in intervals of 5–10 times its diameter.

Then the blank is heated in a separate furnace such that the carrier is burned off and such that the binder metal melts and binds the carbides. Then further machining takes place, such as grinding for example at edge portions, shank portion and clearance surfaces.

With the present method and device a tool can be produced with or without chip flutes and with or without a shank portion and allows a simple handling to a low cost. This can be done without generating dust. Furthermore unsuccessful blanks can simply be remilled and recycled in the extruder. In addition, at least one jaw could be used to make marks in the shank portion of the blank where a plane is to be ground for chucking. Thereby the grinding volume can be minimized.

The invention is in no way limited to the above described embodiments but can be varied freely within the scope of the appended claims. Thus the invention can be used also for making solid end mills. The tool can be coated with layers of for example $Al_2O_3$, TiN and/or TiCN.

What is claimed is:

1. An apparatus adapted to be mounted to an extrusion machine and including an extrusion passage for shaping a mixture received from the extrusion machine into a rotary tool for chip forming machining, the extrusion passage defining a center axis, the apparatus comprising:

a housing adapted to be mounted to an extrusion machine;

a nozzle disposed in the housing and forming a restriction in the extrusion passage;

a die disposed in the housing downstream of the nozzle and forming a portion of the extrusion passage; and a jaw structure situated adjacent a downstream of the die in an inner position defining a portion of the extrusion passage and including an open inlet and an open outlet through which the mixture axially passes upon exiting the die, the jaw structure having at least one jaw including a shaping element arranged to form a shape in an outer periphery of the mixture as the mixture travels axially therepast, the at least one jaw being movable in a direction away from the center axis to an outer position out of engagement with the mixture to avoid applying the shape thereto, wherein the open inlet and the open outlet defined by the jaws disposed in their inner position are of substantially the same size, wherein the die includes a through-hole of circular cross-section, and further including a core disposed in the passage upstream of the circular cross-section through-hole, and wherein the core is rectangular and a pair of pins project from the core in the feed direction for forming flush channels in the tool.

2. An apparatus adapted to be mounted to an extrusion machine and including an extrusion passage for shaping a mixture received from the extrusion machine into a rotary tool for chip forming machining, the extrusion passage defining a center axis, the apparatus comprising:

a housing adapted to be mounted to an extrusion machine;

a nozzle disposed in the housing and forming a restriction in the extrusion passage;

a die disposed in the housing downstream of the nozzle and forming a portion of the extrusion passage; and a jaw structure situated adjacent a downstream of the die in an inner position defining a portion of the extrusion passage and including an open inlet and an open outlet through which the mixture axially passes upon exiting the die, the jaw structure having at least one jaw including a shaping element arranged to form a shape in an outer periphery of the mixture as the mixture travels axially therepast, the at least one jaw being movable in a direction away from the center axis to an outer position out of engagement with the mixture to avoid applying the shape thereto, wherein the open inlet and the open outlet defined by the jaws disposed in their inner position are of substantially the same size, wherein the at least one jaw comprises a plurality of jaws each including a recess for conducting the mixture, the shaping element comprising a helical ridge disposed in the respective recess for contacting the mixture when the jaws are in the inner position, for forming helical chip flutes in an outer surface of the tool.

3. Apparatus adapted to be mounted to an extrusion machine for shaping a mixture received from the extrusion machine into a rotary tool for chip forming machining, the apparatus comprising:

a housing adapted to be mounted to an extrusion machine and forming a through-passage for conducting the mixture in a feed direction, the through-passage defining a center axis;

a nozzle forming a restriction in the passage;

a die disposed downstream of the nozzle and including a through-hole; and at least one jaw situated adjacent a downstream end of the die and movable toward the axis to an inner position in engagement with mixture received from the die for applying a shape thereto, the jaw being movable in a direction away from the center axis to an outer position out of engagement with the mixture to avoid applying the shape thereto, wherein the die through-hole is of circular cross-section, and further including a core disposed in the passage upstream of the circular cross-section through-hole, wherein the core is rectangular and a pair of pins project from the core in the feed direction for forming flush channels in the tool.

4. The apparatus according to claim 3, wherein the at least one jaw comprises a plurality of jaws each including a recess for conducting the mixture, each jaw including a helical ridge disposed in the respective recess for contacting the mixture when the jaws are in the inner position, for forming helical chip flutes in an outer surface of the tool.

5. Apparatus adapted to be mounted to an extrusion machine and including a shaping passage for shaping a mixture received from the extrusion machine into a rotary tool for chip forming machining, the passage defining a center axis, the apparatus comprising:

a housing adapted to be mounted to an extrusion machine;

a nozzle disposed in the housing and forming a restriction in the passage;

a die disposed in the housing downstream of the nozzle and forming a portion of the passage; and a jaw structure situated adjacent a downstream of the die in an inner position defining a portion of the shaping passage and including an open inlet and an open outlet through which the mixture axially passes upon exiting the die, the jaw structure having at least one jaw including a shaping element arranged to form a shape in an outer periphery of the mixture as the mixture travels axially therepast, the at least one jaw being movable in a direction away from the center axis to an outer position out of engagement with the mixture to avoid applying the shape thereto, wherein the die includes a through-hole of circular cross-section, and further including a core disposed in the passage upstream of the circular cross-section through-hole, the core being rectangular and a pair of pins project from the core in the feed direction for forming flush channels in the tool.

6. Apparatus adapted to be mounted to an extrusion machine and including a shaping passage for shaping a mixture received from the extrusion machine into a rotary tool for chip forming machining, the passage defining a center axis, the apparatus comprising:

a housing adapted to be mounted to an extrusion machine;

a nozzle disposed in the housing and forming a restriction in the passage;

a die disposed in the housing downstream of the nozzle and forming a portion of the passage; and a jaw structure situated adjacent a downstream of the die in an inner position defining a portion of the shaping passage and including an open inlet and an open outlet through which the mixture axially passes upon exiting the die, the jaw structure having at least one jaw including a shaping element arranged to form a shape in an outer periphery of the mixture as the mixture travels axially therepast, the at least one jaw being movable in a direction away from the center axis to an outer position out of engagement with the mixture to avoid applying the shape thereto, wherein the at least one jaw comprises a plurality of jaws each including a recess for conducting the mixture, the shaping element comprising a helical ridge disposed in the respective recess for contacting the mixture when the jaws are in the inner position, for forming helical chip flutes in an outer surface of the tool.

* * * * *